(No Model.)
M. R. TALLMAN.
SHUTTER BOWER.
No. 314,750. Patented Mar. 31, 1885.
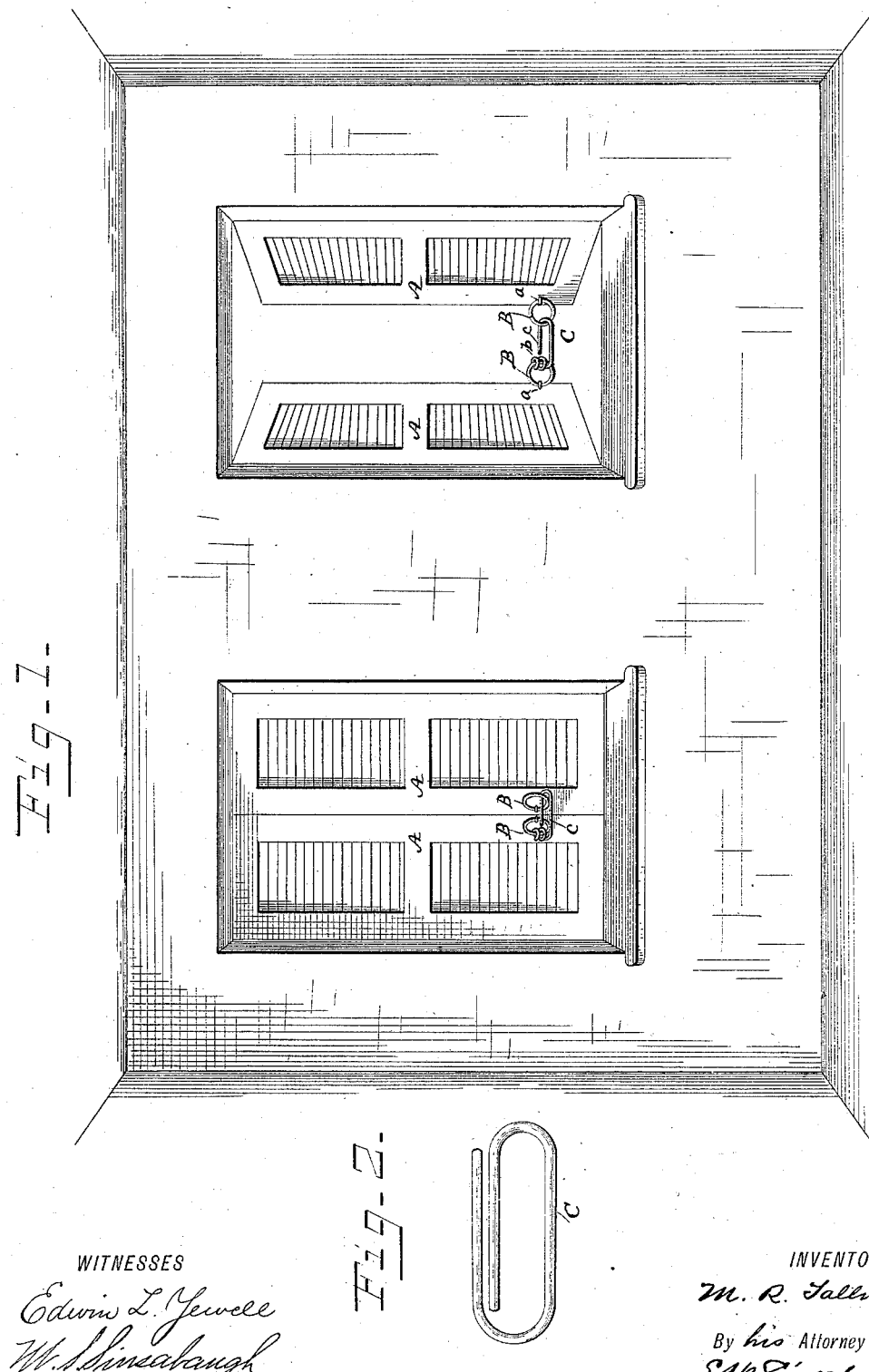
WITNESSES
Edwin L. Jewell
W. Sinsabaugh
INVENTOR
M. R. Tallman
By his Attorney
S. W. Sinsabaugh

UNITED STATES PATENT OFFICE.

MICHAEL R. TALLMAN, OF PHILADELPHIA, PENNSYLVANIA, ASSIGNOR OF ONE-HALF TO SAMUEL L. FOSTER, OF SAME PLACE.

SHUTTER-BOWER.

SPECIFICATION forming part of Letters Patent No. 314,750, dated March 31, 1885.

Application filed January 9, 1885. (No model.)

*To all whom it may concern:*

Be it known that I, MICHAEL R. TALLMAN, a citizen of the United States, residing at Philadelphia, in the county of Philadelphia and State of Pennsylvania, have invented certain new and useful Improvements in Shutter-Bowers, of which the following is a specification, reference being had therein to the accompanying drawings.

My invention relates to improvements in shutter-bowers.

The object of my invention is to provide a safe and reliable device for holding the shutters of a building in a partially-opened position, said device being so constructed and attached to the shutters that it cannot be taken off unless the shutters are in a closed position, thus rendering it impossible for sneak-thieves to open the shutters from the outside.

My invention consists of an open elongated link secured to rings attached to the inside of the shutter in such a manner that said link cannot be removed or detached from the rings unless the shutters are in a closed position, as will more fully appear.

Figure 1 is a view in perspective of the interior of a room, showing my device attached to partially opened and closed shutters. Fig. 2 is a top or plan view of a link which is a modification of my device.

A indicates the shutters, to which are secured the rings B by means of the staples a, or in any other convenient manner which will permit the rings to swing loosely. The rings are secured near the outer edge of the shutters, so that when the shutters are closed they will come close together.

C is a link or hook made of good strong wire, one end of which is coiled, as shown at b, and adapted to embrace one of the rings within the coil, as shown. The other end of link is bent to form an elongated hook, and when the shutters are closed the free end or arm of the link is passed through the other ring on the adjacent shutter. The space between the inside circle of the coil b and the end of the hook or arm c is substantially the same as the distance between the rings, so that when the shutters are closed the link can be attached to or detached from the rings; but when the shutters are in a partially-open position the link cannot be taken from either ring, it being necessary for the shutters to be closed before the link can be either attached or detached.

The advantage of having the coil b adapted to encircle one of the rings is to prevent the link from becoming accidentally detached from the shutters and lost, as might be the case if the shutters were thrown violently open or slammed back and forth by the wind.

In Fig. 2 I have shown an open link having the free ends elongated, so as to extend past each other. This form of fastening is applied to rings secured to the shutters in the same manner as the device previously described, and is designed as a modification.

I do not wish to limit myself to the forms shown, as it is obvious that other devices can be made which would embody the spirit of my invention.

Having thus described my invention, what I claim, and desire to secure by Letters Patent, is—

1. A shutter bower and lock consisting of an open oblong link, the opening of which is near the end of the link, as described, and two rings secured to the inside of the shutter working loosely in said link, whereby the device is rendered incapable of being unlocked from the outside of the building, as set forth.

2. A shutter-bower consisting of a wire spirally coiled at one end to engage with a ring secured to the shutter, the other end of said wire being formed into an elongated hook or link, said hook being adapted to be engaged with or disengaged from a ring on the other shutter only when both shutters are in a closed position, as set forth.

In testimony whereof I affix my signature in presence of two witnesses.

MICHAEL R. TALLMAN.

Witnesses:
 WALTER C. RODMAN,
 SAMUEL L. FOSTER.